Feb. 3, 1925.                                                1,524,925
                    D. H. FURREY
              AUXILTARY AUTOMOBILE WHEEL
                  Filed Dec. 14, 1923
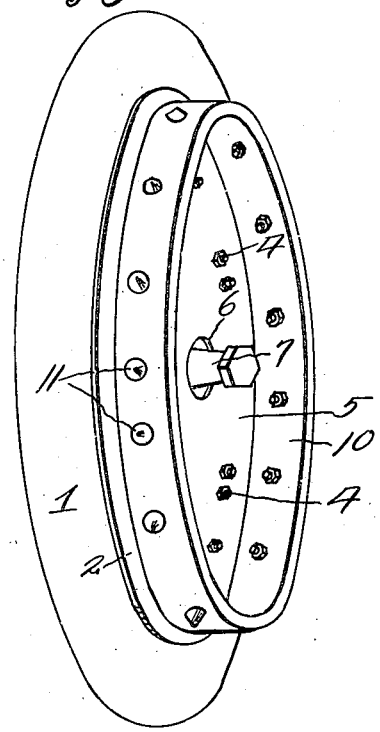
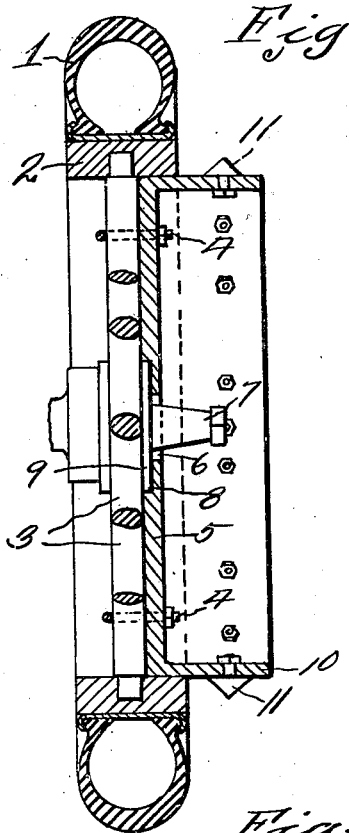
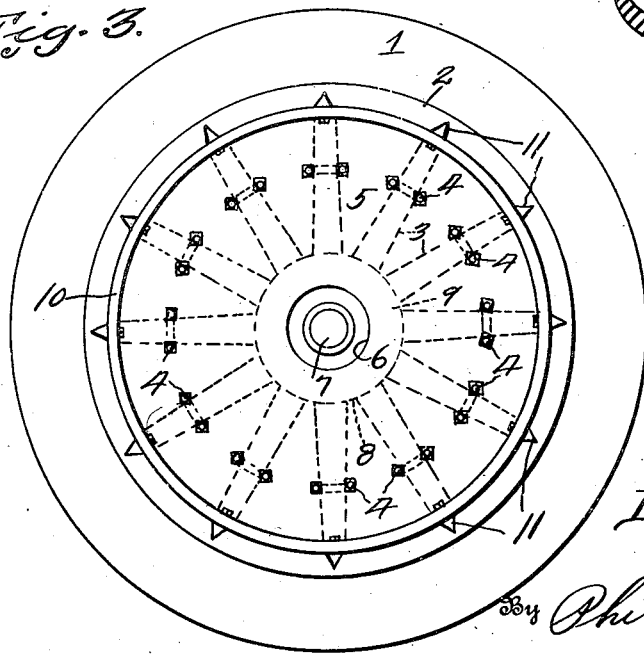
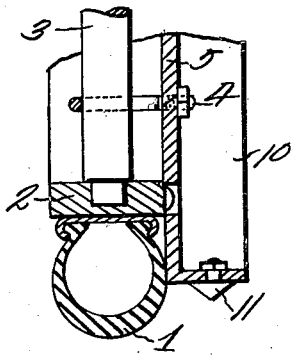
Inventor
D. H. Furrey
By Philip A. H. Ferrell
                    Attorney Patented Feb. 3, 1925.

1,524,925

UNITED STATES PATENT OFFICE.

DANIEL H. FURREY, OF OMAHA, NEBRASKA.

AUXILIARY AUTOMOBILE WHEEL.

Application filed December 14, 1923. Serial No. 680,651.

*To all whom it may concern:*

Be it known that DANIEL H. FURREY, citizen of the United States, residing at Omaha, in the county of Douglas and State of Nebraska, has invented certain new and useful Improvements in Auxiliary Automobile Wheels, of which the following is a specification.

The invention relates to auxiliary wheel treads, particularly adapted for use in connection with automobile wheels, and constructed in a manner whereby it may be easily and quickly attached to an automobile wheel and form an additional tread surface for the wheel when the automobile is going over sandy roads or through mud, thereby preventing stalling of the automobile, and at the same time, the device is constructed in a manner whereby when the automobile is going over good roads or streets, the auxiliary treads will be out of engagement with the roadbed.

A further object is to provide the tread with peripheral lugs for increasing the traction thereof and prevent spinning of the wheel when in the mud or sand.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of a conventional form of automobile wheel, showing the device applied thereto.

Fig. 2 is a vertical transverse sectional view through the automobile, and auxiliary tread.

Figure 3 is a side elevation of an automobile wheel, showing the device applied thereto.

Figure 4 is a detail sectional view transversely through one side of an automobile wheel, showing the modified form of auxiliary tread.

Referring to the drawing, the numeral 1 designates a conventional form of automobile tire and 2 the felly on which said tire is mounted. The wheel is provided with conventional radially disposed spokes 3, to which is secured by means of U-bolts 4 the auxiliary tread plate 5. Plate 5 centrally thereof is provided with an opening 6, through which the hub 7 of the wheel extends, and is preferably provided with the annular channel 8 for receiving the hub flange 9 of the wheel. Plate 5 has its outer periphery in engagement with the inner periphery of the felly 2, therefore it will be seen that when the annular tread flange 10 carried thereby is in engagement with the ground, for instance when going through mud or sand, the strain will be relieved from the spokes 3, thereby preventing loosening of the same or dishing of the wheel. Tread flange 10 may be of any width desired, however it will be seen that when the wheel is going over relatively good road, the flange 10 will not engage the road and consequently the usual traction takes place. However when the wheel enters sandy or muddy roads of the condition which would interfere with the proper traction of the wheel, the extra tread surface formed by the flange 10 will prevent the wheels of the automobile from sinking to a distance where the vehicle would become stalled or mired. To prevent spinning of the wheel, the auxiliary tread flange 10 is provided with lugs 11, which bite into the ground and increase the traction thereof.

Referring to Figure 4 wherein a modified form is shown, the construction is substantially the same with the exception that the plate 5 engages the outer side of the felly 2 and has its flange located closer to the tread of the tire 1, thereby positioning the flange 10 where it will come into operation quicker than in the form shown in Figure 1, however the operation is substantially the same.

From the above it will be seen that an auxiliary tread is provided for an automobile wheel, which tread may be easily and quickly applied to an automobile wheel without modifying the construction of the wheel, and the tread will prevent miring or spinning of the wheel when in sandy or muddy ground.

The invention having been set forth what is claimed as new and useful is:—

The combination with an automobile wheel, a felly, radially disposed spokes carried by said felly, of an auxiliary tread for said wheel, said tread comprising a plate engaging the sides of the spokes, U-bolts connecting said plate to the spokes, an annular flange extending outwardly from one side of the plate and one side of the wheel and forming an auxiliary, said flange engaging the inner periphery of the felly and lugs carried by the outer periphery of the flange.

In testimony whereof I affix my signature.

DANIEL H. FURREY.